United States Patent
Sibum

(10) Patent No.: US 7,025,248 B2
(45) Date of Patent: Apr. 11, 2006

(54) METHOD FOR MANUFACTURING A TITANIUM SHEET AND A SHAPED COMPONENT CONSISTING OF THE TITANIUM SHEET

(75) Inventor: Heinz Sibum, Essen (DE)

(73) Assignee: Deutsche Titan GmbH, Essen (DE)

( * ) Notice: Subject to any disclaimer, the term of this patent is extended or adjusted under 35 U.S.C. 154(b) by 0 days.

(21) Appl. No.: 10/470,329

(22) PCT Filed: Jan. 24, 2002

(86) PCT No.: PCT/EP02/00712

§ 371 (c)(1),
(2), (4) Date: Dec. 4, 2003

(87) PCT Pub. No.: WO02/058923

PCT Pub. Date: Aug. 1, 2002

(65) Prior Publication Data

US 2004/0069838 A1   Apr. 15, 2004

(30) Foreign Application Priority Data

Jan. 25, 2001 (DE) ................. 101 03 169

(51) Int. Cl.
 *B23K 31/02* (2006.01)
 *B23K 1/19* (2006.01)
 *B23K 20/16* (2006.01)
(52) U.S. Cl. .............. 228/235.2; 228/262.1; 228/262.5; 228/262.71
(58) Field of Classification Search ............ 228/235.2, 228/187, 262.1, 262.5, 262.71; 428/629
See application file for complete search history.

(56) References Cited

U.S. PATENT DOCUMENTS

| 3,165,829 | A | | 1/1965 | Wardlaw |
| 3,359,142 | A | | 12/1967 | Ward, Jr. et al. |
| 3,397,045 | A | | 8/1968 | Winter |
| 3,496,621 | A | | 2/1970 | Winter |
| 3,711,937 | A | * | 1/1973 | Emley .................. 228/206 |
| 4,046,304 | A | * | 9/1977 | Tabata et al. ............ 228/187 |
| 4,197,360 | A | | 4/1980 | Throop |
| 5,373,257 | A | | 12/1994 | Shimoda |

(Continued)

FOREIGN PATENT DOCUMENTS

DE   32 16 208 C2   11/1982

(Continued)

*Primary Examiner*—Lynne R. Edmondson
(74) *Attorney, Agent, or Firm*—Proskauer Rose LLP

(57) ABSTRACT

The invention relates to a roll-bonded titanium sheet (6), a shaped component manufactured therefrom (10) and a method for manufacturing the titanium sheet (6) and the shaped component (10). In order to achieve a high-temperature-resistant shaped component (10), a titanium sheet (2) is roll-bonded at least on one side with aluminium foil (4) whose thickness (d) is small compared with the thickness (D) of the titanium sheet (2). As a result of heat treatment of the roll-bonded titanium sheet (6), the aluminium and titanium from the adjoining region are converted to an aluminium-titanium alloy. The outer titanium-aluminium-alloy layer of the titanium sheet (6) thus formed is converted by contact with oxygen into a titanium-aluminium-mixed oxide layer which gives the titanium sheet (6) good corrosion protection. The forming of the shaped component (10) preferably takes place before the heat treatment for alloy formation because the roll-bonded titanium sheet (6) is then still slightly deformable.

5 Claims, 1 Drawing Sheet

U.S. PATENT DOCUMENTS

| | | | | |
|---|---|---|---|---|
| 5,476,725 A * | 12/1995 | Papich et al. | ................ | 428/654 |
| 6,593,010 B1 * | 7/2003 | Izbicki et al. | ................ | 428/659 |
| 6,670,050 B1 * | 12/2003 | Raybould et al. | ............ | 428/629 |
| 2004/0009359 A1 * | 1/2004 | Alger | ....................... | 428/472.2 |
| 2004/0060685 A1 * | 4/2004 | Ray et al. | .................... | 164/114 |
| 2004/0104021 A1 * | 6/2004 | Kujirai | ....................... | 165/185 |

FOREIGN PATENT DOCUMENTS

| | | |
|---|---|---|
| DE | 32 19 071 A1 | 11/1983 |
| JP | 63140782 | 6/1988 |
| JP | 04160126 | 6/1992 |
| JP | 08090257 | 4/1996 |

\* cited by examiner

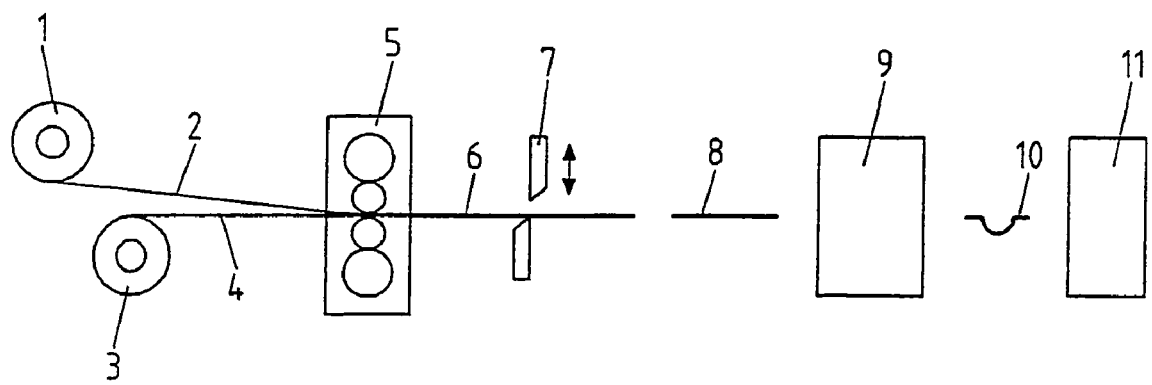

METHOD FOR MANUFACTURING A TITANIUM SHEET AND A SHAPED COMPONENT CONSISTING OF THE TITANIUM SHEET

Since a sheet of a single metal generally does not have optimum properties (strength, corrosion protection, deformability, low weight) for specific operational purposes in every respect, composite materials have been developed, consisting of roll-bonded sheets of various materials. In particular, a roll-bonded sheet and its manufacture is known (U.S. Pat. No. 3,711,937 A) consisting of an aluminium sheet as the base sheet and a titanium cladding film. In order to join the two components together by roll bonding, after preheating to approximately 500° C. these are fed to a roll stand in which they are joined securely one to the other, associated with a thickness reduction of up to 50%. In order to improve the quality of the titanium-aluminium join at the boundary layer, heat after-treatment then takes place at temperatures up to approximately 600° C. A characteristic feature of such a composite sheet is that the aluminium sheet is covered with the film of pure titanium on its outer side. Such composite sheets may be well-suited for various applications such as aircraft building, heat exchangers and electrochemical plants. However, they are not suitable for high-temperature applications such as, for example, as components in exhaust gas systems of internal combustion engines where temperatures far above 600° C. are common, because the pure aluminium does not withstand the prevailing operating temperatures and the pure titanium does not offer sufficient corrosion protection.

U.S. Pat. 4,046,304 discloses a further Ti—Al composite sheet and a method for its manufacture. As part of this method, a thin aluminum foil is initially bonded with a substrate sheet consisting of a metallic material, for example, titanium, by cold pressure bonding. The composite sheet thus produced is then diffusion-annealed at 350° C. to form a very thin Ti—Al diffusion layer. In a further step, in order to produce the final composite sheet, an aluminum sheet is placed on the aluminum surface of the intermediate composite sheet and bonded thereto by hot pressure bonding at a temperature of 400° C. Finally, the composite sheet can be subjected to further heat treatment to improve the bonding. A disadvantage with the composite sheet produced by this process is likewise its lack of suitability for high-temperature applications as a result of the low heat resistance of the pure aluminum fraction.

JP-A-63 140 782 discloses a method for manufacturing a titanium sheet panel aluminum clad on both sides. In this case, the Al layers are applied to the Ti sheet panel by roll bonding and then diffusion annealed at a temperature of 500 to 600° C. for duration of 1 to 6 hours in a continuous-heating furnace in vacuo or in an inert-gas atmosphere. As a result, a high-strength bond is formed among the individual material layers. However, the high-temperature suitability of this composite material is also limited because of the pure aluminum fraction.

SUMMARY OF THE INVENTION

The object of the invention is to develop a method for manufacturing a sheet that can be used in the high-temperature range up to approximately 800° C., that offers sufficient corrosion protection and can be formed into a shaped component.

The object is solved by a method for manufacturing a roll-bonded titanium sheet, which comprises the following procedural steps:
  a) The titanium sheet is roll-bonded with an aluminium foil at least on one side.
  b) The aluminium and the titanium from the adjoining region are converted into a titanium-aluminium alloy by heat treatment of the roll-bonded titanium sheet.
  c) The outer titanium-aluminium alloy layer of the titanium sheet is converted into a titanium-aluminium mixed oxide layer by contact with oxygen.

The titanium sheet is roll-bonded at least on one side with an aluminum foil, whose thickness is small compared with the thickness of the titanium sheet.

In order that sufficient corrosion protection is obtained by heat treatment of the titanium sheet which is still justifiable in terms of manufacturing technology, the aluminum foil should be very thin compared with the titanium sheet. Good experience has been obtained with a thickness ratio of the aluminum foil used and the titanium sheet used being in the range of a power often, especially with a titanium sheet having a thickness between 1 and 2.5 mm and an aluminum foil having a thickness between 0.1 and 0.2 mm. After the roll bonding associated with a reduction in the thickness of the aluminum foil, the aluminum layer should be between 0.02 and 0.06 mm. Such thin aluminum layers can be alloyed through their full thickness without any problem so that after the formation of the mixed oxide the titanium sheet has optimum, permanent corrosion protection even under extreme operating conditions such as those prevailing in the exhaust gas system of a combustion engine.

BRIEF DESCRIPTION OF THE DRAWING

The invention is explained in greater detail in the following with reference to a schematic drawing showing the method according to the invention.

Aluminum foil 2 having a thickness of 0.1 to 0.2 mm is drawn from a coil 1 and titanium sheet 4 in strip form having a thickness of 1 to 2.5 mm is drawn from a coil 3 and fed to a roll stand 5 at ambient temperature. As a result of the rolling pressure and the friction of the aluminum foil 2 and the strip-like titanium sheet 4 one above the other, an increase in temperature occurs in the rolling gap which is sufficient to bond the aluminum foil 2 onto the strip-like titanium sheet 4. Any oxide layer which may adversely affect the join is sufficiently broken up by the friction between the aluminum foil 2 and the strip-like titanium sheet 4. After leaving the roll stand 5, the aluminum-clad titanium strip 6 is fed to shears 7 which cut it to length into panels 8. The panels 8 can be stacked or supplied for further processing 9, for example, to an installation for cutting and forming into shaped components 10. Since no alloy formation between the strip-like titanium sheet 4 and the aluminum foil 2 has taken place because of the lack of heat treatment up till this time, the aluminum-clad titanium strip 6 can easily be deformed as composite sheet. Finally, the shaped components 10 are delivered to heat treatment 11 which allows the alloy profile to be adjusted by temperature and time control. The shaped components 10 with the alloy layer on one side are than exposed to the oxygen atmosphere so that the desired titanium-aluminum-mixed oxide layer forms as a corrosion protective layer.

It is to be understood that an aluminium foil can be bonded onto the titanium sheet 4 not only on one side, as in the exemplary embodiment, but also on both sides. In this case, a further coil of aluminium foil is then provided.

The invention is especially good for dividing the work. The manufacturer of the aluminium-clad titanium sheet either supplies this in panel format or as a coil to a processor which: then produces blanks and shaped components 10 therefrom. The processor can carry out the heat treatment of the shaped components 10 for alloy formation as the final production stage but this can be dispensed with if the shaped components 10 are exposed during subsequent operational use to operating temperatures sufficient for alloy formation.

To sum up, the following advantages are obtained as a result of the invention: light weight and high strength as a result of the material used, i.e., titanium, good corrosion protection as a result of the titanium-aluminium-mixed oxide layer, easy deformability of the titanium sheet before the alloy formation of the titanium-aluminium-mixed oxide layer and strength at high temperatures (far above 600° C.).

What is claimed is:

1. A method for manufacturing a roll-bonded titanium sheet comprising the following procedural steps:
    a. roll-bonding at least on one side of the titanium sheet with an aluminum foil whose thickness is small compared with the thickness of the titanium sheet;
    b. converting aluminum and titanium from adjoining regions to a titanium-aluminum alloy by heat-treatment of the roll-bonded titanium sheet until the aluminum foil is completely converted into the titanium alloy;
    c. converting an outer titanium-aluminum alloy layer of the titanium sheet into a titanium-aluminum-mixed oxide layer by contact with oxygen;
    wherein the thickness of the aluminum layer after the roll-bonding is between 0.02 and 0.06 mm.

2. The method according to claim 1, wherein the thickness ratio (d/D) of the aluminum foil used and the titanium sheet used is in the range of a power of ten.

3. The method according to claim 1, wherein the thickness (D) of the titanium sheet used is between 1 and 2.5 mm and the thickness (d) of the aluminum foil used is between 0.1 and 0.2 mm.

4. The method according to claim 1 for manufacturing a shaped component wherein the forming of the roll-bonded titanium sheet into the shaped component takes place before the heat treatment for alloy formation.

5. The method according to claim 4, wherein the heat treatment for alloy formation takes place during use of the shaped component.

* * * * *